United States Patent [19]

Wilson

[11] Patent Number: 5,032,335

[45] Date of Patent: Jul. 16, 1991

[54] MANUFACTURE OF SEALING ELEMENTS OF COMPOSITE SINTERED POLYMERIC MATERIAL

[75] Inventor: David Wilson, Monroe, Mich.

[73] Assignee: Mather Seal Company, Milan, Mich.

[21] Appl. No.: 378,897

[22] Filed: Jul. 12, 1989

[51] Int. Cl.⁵ .......................... B29C 43/20; B32B 1/10
[52] U.S. Cl. ................................... 264/113; 264/118; 264/120; 264/127; 264/159; 264/248
[58] Field of Search ............... 264/113, 120, 126, 127, 264/122, 248, 118, 159

[56] References Cited

U.S. PATENT DOCUMENTS

| | | | |
|---|---|---|---|
| 3,255,278 | 6/1966 | Smith | 264/113 |
| 3,311,522 | 3/1967 | Ladd et al. | 264/248 |
| 4,102,966 | 7/1978 | Duperray et al. | 264/112 |
| 4,243,235 | 1/1981 | Repella | 264/159 |
| 4,364,884 | 12/1982 | Traut | 264/118 |
| 4,391,861 | 7/1983 | Nilsson | 428/35 |
| 4,900,629 | 2/1990 | Pitolaj | 428/422 |
| 4,937,025 | 6/1990 | Foster et al. | 264/120 |

Primary Examiner—Mary Lynn Theisen
Attorney, Agent, or Firm—Lawrence J. Shurupoff

[57] ABSTRACT

A sealing element for use with a radial lip oil seal includes a mounting section formed of a first polymer and a sealing section formed of a second polymer. The sealing element sections are bonded together during a common sintering operation so that each polymer is sintered only once. This reduces molecular degradation of the polymers typically caused by multiple sintering operations.

6 Claims, 2 Drawing Sheets

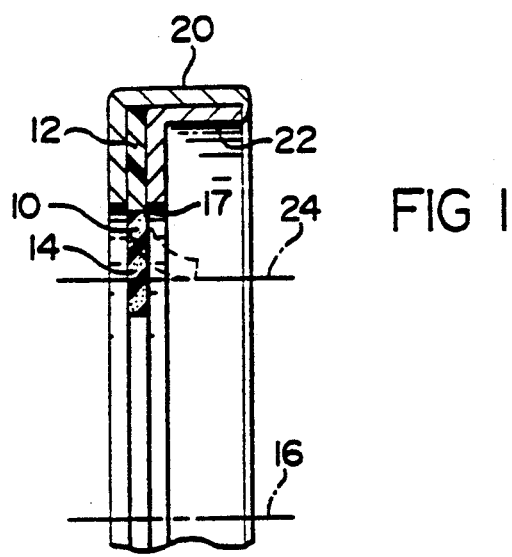
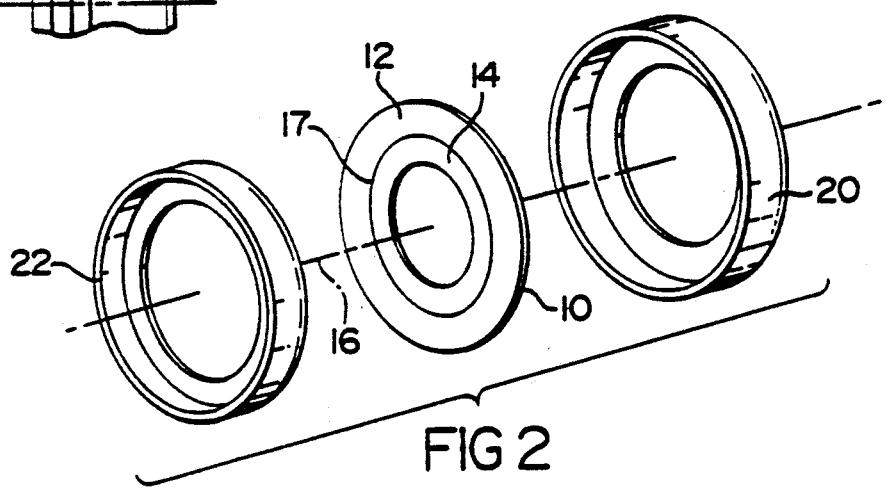
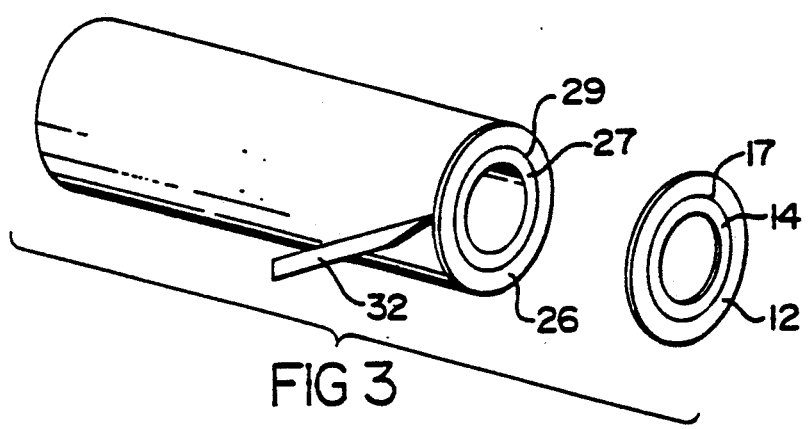
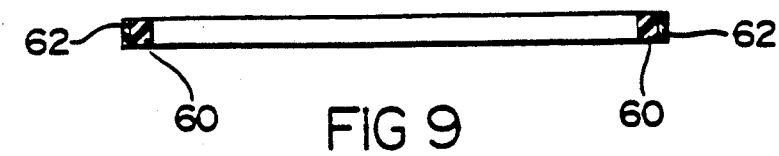

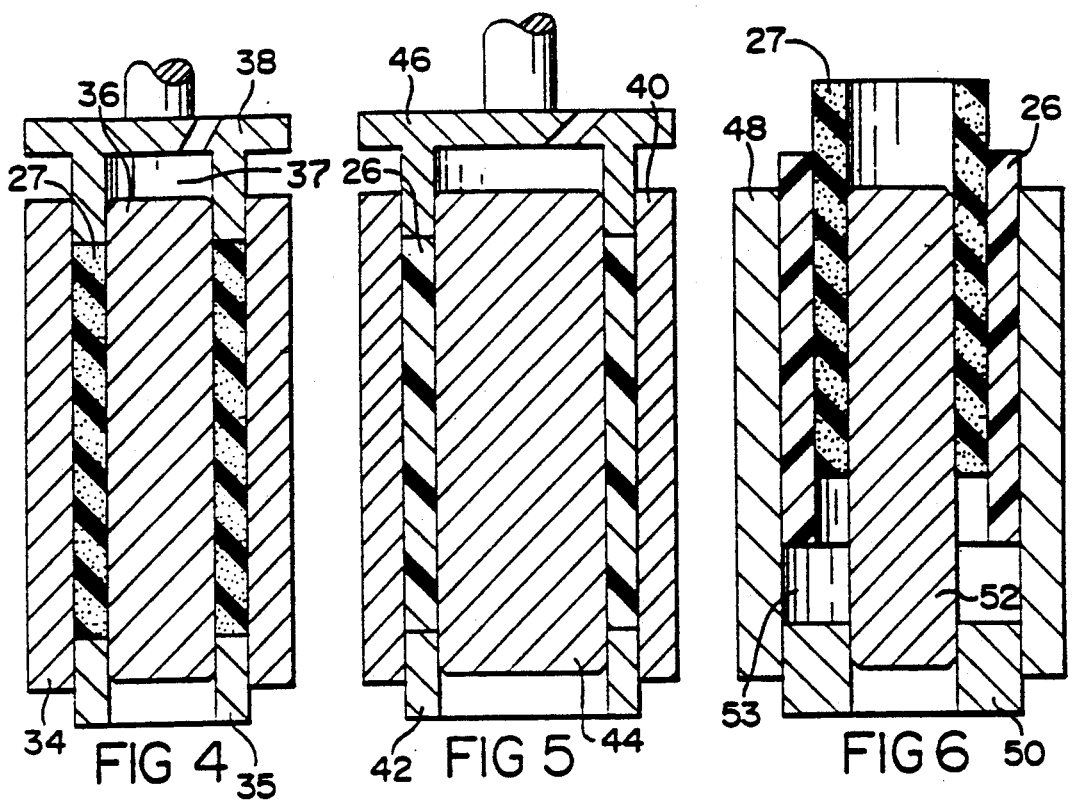
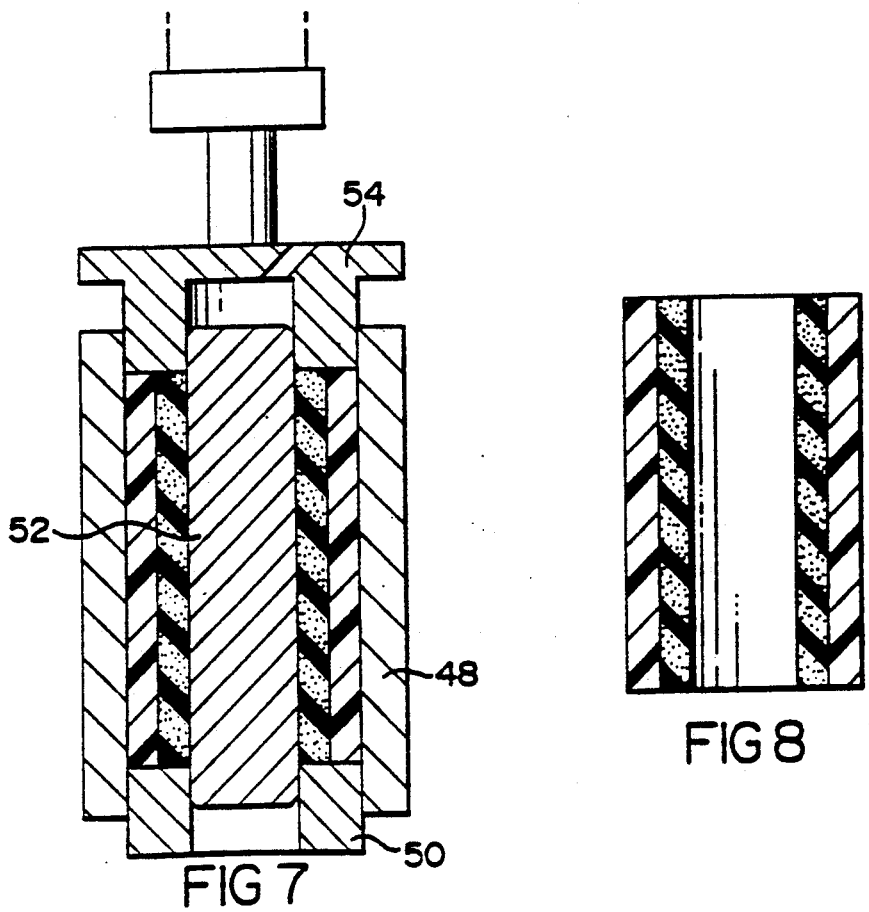

MANUFACTURE OF SEALING ELEMENTS OF COMPOSITE SINTERED POLYMERIC MATERIAL

BACKGROUND OF THE INVENTION

1. Field of the Invention

This invention relates generally to materials formed of fluorinated resin powders and particularly relates to sealing elements formed of sintered fluorine based polymers such as polytetrafluoroethylene.

2. Description of Prior Developments

Polytetrafluoroethylene (PTFE) is commonly used in the manufacture of sealing elements such as the annular disk-shaped seal lips of radial lip oil seals. PTFE is chosen for oil seal applications because it has relatively good wear resistance and elasticity at operating temperatures up to about 400° F. PTFE also has good resistance against chemical attack by oils and other liquids frequently present in oil seal applications.

Disk-type sealing elements have been made by compacting PTFE powder into a tubular preform which is sintered to form a billet. The billet is then sliced along radial planes so as to form a plurality of annular disks with each disk constituting one sealing element. In order to improve the performance of PTFE sealing elements, various fillers in finely divided form are sometimes added to the PTFE powders prior to their compaction and sintering. Commonly, such fillers are finely dispersed powdered fiberglass, molybdenum disulphide, and/or graphite. Fillers can improve the wear resistance and compressive strength of the sealing elements while adding lubricity to its sealing surfaces.

When disk-shaped sealing elements containing fillers are formed by slicing through a tubular billet, each disk-shaped slice will have finely dispersed fillers uniformly distributed throughout its entire radial dimension, from its inner circumferential edge to its outer circumferential edge. The type of finely dispersed fillers typically needed at or near the contact sealing surface of the disk element are not the same type required or desirable for use in the area of the disk element used for mounting the element on a support member. Prior manufacturing techniques could not adequately provide for the selective addition of one or more fillers to different portions of a polymeric sealing element.

Since the fillers are typically less expensive than pure fluorine based polymers, cost savings can be realized by filling the mounting portion with inexpensive fillers. It is thus desirable from a cost consideration to be able to form an annular sealing element with one type of filler provided along its sealing surface which undergoes relative dynamic contact, and another type of economical filler provided in its static mounting portion. That is, the greater the amount of inexpensive filler provided in the mounting portion, the less costly will be the sealing element.

Although it is possible to form two separate sintered billets with different fillers in each billet, and to subsequently join the billets in a nested concentric configuration, the joining of the separate pre-sintered billets requires a second sintering operation. In the case of sealing elements, a second sintering generally causes a loss of wear resistance. This is due to the molecular degradation which takes place during the second sintering wherein the long polymer chains are broken into shorter chains.

Another drawback associated with double sintering is the necessity to apply compaction pressure in a mold press to the once sintered billets during the second sintering. This requires the mold press to be maintained in a heated state during the second sintering. This type of process consumes a great deal of mold time and is thus not well suited to high volume production and the efficient use of mold time.

A process somewhat related to the present invention is disclosed in U.S. Pat. No. 4,243,235 to J. Repella wherein a composite sealing element is formed with an elastomer-to-PTFE adhesive bond. In this process, an axially elongated composite tubular billet is created by first placing a sintered PTFE tube in an oversized cylindrical mold cavity. One surface of the PTFE tube is etched and coated with an adhesive. An annular space between the adhesively-coated surface of the PTFE tube and the facing mold cavity surface is then filled with an elastomer.

The elastomer can be a resilient plastic such as rubber or polyurethane which can be injected into the mold cavity or placed in the cavity as a precharge. The elastomer can be pre-cured or uncured, i.e. vulcanized during the molding operation. Heat and pressure are applied to the mold to form a tubular billet having a bond formed at the annular interface between the PTFE tube and the elastomeric annulus. Multiple sealing disk elements are formed by slicing through the plastic and elastomeric tubular billet along radial planes.

During service, a composite plastic-elastomeric sealing disk of the type disclosed in U.S. Pat. No. 4,243,235 may fail due to differential thermal expansion of the different materials (plastic and elastomer) along their bond interface. That is, differences in the expansion rate and contraction rate of the two different materials can, in time, weaken or impair the bond at the annular interface between the two materials. Flexure of the plastic section relative to the elastomeric section can also overstress the joint between the two sections.

By heating the PTFE a second time during bonding of the PTFE to the elastomer, the crystallinity of the PTFE may be adversely affected. This can reduce the wear resistance of the PTFE and thus adversely affect the performance of the sealing element. Moreover, elastomeric materials do not possess the ability to withstand temperatures as high or as low as PTFE, nor can elastomers resist chemical attack as well as PTFE and its related polymers.

Accordingly, a need exists for a low cost composite sealing element which minimizes differential thermal expansion between materials, which requires no additional adhesives or pre-bonding surface preparation such as chemical etching and which minimizes molecular degradation due to multiple sinterings.

SUMMARY OF THE INVENTION

The present invention provides a method of manufacturing sealing elements wherein two axially elongated unsintered tubular preforms are arranged concentrically, one within the other, to form a composite tubular billet. No surface preparation is required such as chemical etching, nor is any adhesive required to form the bond between the preforms. In one embodiment, one of the tubular preforms is formed of compacted polymer powders, and the other tubular preform is formed of compacted polymer powders and finely dispersed fillers.

The composite tube formed of the two unsintered preforms is further compacted in a mold, removed from the mold and then free sintered to form a cured composite tubular billet that is subsequently sliced along multiple radial planes to form individual composite sealing disks. Each composite sealing disk will thus have one annular section formed of one type of polymer such as unfilled PTFE, and another annular section formed of another or the same type of polymer such as PTFE and finely dispersed fillers. The concentration of fillers in only one annular section of each annular disk is made possible by the initial method of preform manufacture, i.e. forming two tubular preforms separately so that each preform may include any desired fluorine based polymer, with or without a filler or fillers.

That is, one of the tubular preforms may be formed of a compacted mass of one type of resin such as a fluorinated polymer resin powder and the other tubular preform may be formed of a compacted mass of a different type of resin such as another fluorinated resin powder. In this case, either one, both or neither of the powders may be filled. In the present invention the same polymer or highly similar polymers may be used in both sections of the sealing element disk, i.e. the mounting section and the sealing section, such that differential thermal expansion between sections is minimized.

In carrying out the invention it is preferred to use PTFE molding powders that are formed of virgin material, i.e. material that has not previously been subjected to heating or other treatments tending to reduce its molecular weight via molecular degradation. Reclaimed, offgrade, or previously used unsintered PTFE materials and the like may be used to economically form the preforms, particularly for the mounting sections of sealing elements which do not experience dynamic wear.

Molecular degradation of fluorine-based manufactured articles such as PTFE sealing elements is to be avoided if at all possible because molecular degradation adversely affects the wear resistance as well as the elasticity and recovery properties of the material, i.e. the ability of the material to return to an initial configuration after removal of a biasing force. This is caused by the breaking of the long polymer molecules into shorter molecules under the application of sintering temperatures. The adverse effects of molecular degradation are somewhat increased when the PTFE material has fillers finely dispersed therein and are further increased with each subsequent sintering.

If virgin (unsintered) PTFE materials are used in carrying out the invention, the materials will be ensured of being heated into the sintering range only once during manufacture, i.e. when the compacted and concentrically arranged preforms are subjected to a free sintering step as the last stage in forming the composite billet. Because the billets are free sintered in an oven after being removed from their compacting molds, the compacting molds are immediately available for use and need not be heated as in prior processes. This allows for economic batch process sintering of the preforms.

By limiting the heating (sintering) to a single occurrence it is possible to limit and carefully control the undesired molecular degradation that adversely affects performance of the final product. Thus, a significant advantage of the present invention is a controlled (low) degree of molecular degradation in the final product. This result is made possible because the fluorine-based polymer materials are subjected to only one heating step.

BRIEF DESCRIPTION OF THE DRAWINGS

FIG. 1 is a fragmentary view taken through a sealing element constructed according to the invention. The sealing element is shown installed in a rigid annular casing.

FIG. 2 is an exploded perspective view of the sealing element of FIG. 1.

FIG. 3 is a perspective view of an axially elongated tubular preform used to make the FIG. 1 sealing element. FIG. 3 also shows a sealing disk element severed from the preform.

FIG. 4 is a sectional view taken through a compacting device used to form one component part of the FIG. 3 preform.

FIG. 5 is a sectional view taken through another compacting device used to form a different component part of the FIG. 3 preform.

FIG. 6 shows the tubular components of FIGS. 4 and 5 partially inserted into a third compacting device.

FIG. 7 shows the FIG. 6 compacting device in condition for exerting an axial compaction force on two tubular preform components.

FIG. 8 shows the compacted composite preform produced according to FIG. 7. After sintering, the FIG. 8 preform will be cut into slices, as depicted schematically in FIG. 3.

FIG. 9 is a perspective view taken through an annular sealing element produced by the method of this invention. The FIG. 9 sealing element is similar to the FIG. 1 sealing element insofar as the method of manufacture is concerned. Differences relate to product usage and dimensional relationships.

DETAILED DESCRIPTION OF A PREFERRED EMBODIMENT

FIG. 1 shows a sealing element of this invention installed in a two piece annular radial lip seal casing. The sealing element is formed as a one piece plastic wafer such as disk element 10 of annular configuration. Element 10 includes a radial outer annular mounting section 12 and a radial inner sealing section 14. The two sections 12 and 14 are concentrically arranged on an imaginary central axis 16 and are joined together along an annular axial interface line 17.

As seen in FIG. 2, mounting section 12 is clamped between an outer casing 20 having a cup-shaped wall structure and an inner casing 22 also having a cup-shaped wall structure. The radially inner annular edge area of sealing section 14 can be deflected by engagement with a cylindrical surface 24 of a rotary shaft, as depicted in phantom in FIG. 1. The sealing element is designed to seal against the passage of a fluid, i.e. oil, through an annular joint between stationary sealing element 10 and shaft surface 24.

In one embodiment, annular mounting section 12 of the sealing element 10 is formed entirely of an unfilled fluorine based polymer such as a pure fluoroethylene polymer devoid of fillers. Annular sealing section 14 is formed of a fluoroethylene polymer having finely divided dispersed fillers incorporated therein. The stippling in FIGS. 1, 4, 6, 7, 8 and 9 is used to designate dispersed fillers within the cross sectioned materials.

The preferred fillers are selected to give annular section 14 improved lubricity. Filler materials may be chopped fiberglass, finely divided graphite and molybdenum disulphide. It should be noted that such fillers are incorporated only into the sealing section 14. Mounting section 12, which from functional considerations does not require any fillers and does not experience dynamic wear, may be formed of off-grade or reclaimed material which is devoid of fillers or highly filled with inexpensive fillers. Thus, the amount and the location of fillers can be controlled and the material cost can be reduced by using lower cost materials in each sealing element than conventionally used without adversely affecting seal performance.

FIG. 3 shows a tubular billet used to form the FIG. 1 sealing element. The tubular billet includes two tubes 26 and 27 concentrically arranged, one within the other. The tubes are joined together along an annular axial interface 17. Inner tube 27 constitutes the material for annular sealing section 14 (FIG. 1), whereas outer tube 26 constitutes the material for annular mounting section 12 (FIG. 1).

The tubular billet may be machined into a multiplicity of disk-type sealing elements 10 by slicing through the billet along radial planes normal to its axis. FIG. 3 schematically shows a cut-off tool 32 contacting the outer surface of the billet in preparation for slicing into the billet material in a known fashion. The billet may be chucked into a lathe (not shown) to rotate the billet while the cutting action is taking place, as described in aforementioned U.S. Pat. No. 4,243,235.

The concentrically arranged tubes 26 and 27 are formed individually in two separate compaction devices shown in FIGS. 4 and 5. The device shown in FIG. 4 is used to form tube 27. The device shown in FIG. 5 is used to form tube 26.

Referring to FIG. 4, there is shown a compaction device that includes an outer upright cylinder 34 having an inner cylinder 35 slidably fitted therein with a close clearance fit. Cylinder 35 is typically disposed on a suitable support surface for reacting compaction forces. A cylindrical central plug element 36 is slidably mounted within cylinder 35 and is dimensioned to closely fit within recess 37 formed in ram 38.

Powdered virgin (unsintered) polytetrafluoroethylene (or a similar fluorinated resin powder) and, if desired, filler powders are pre-mixed together to a uniform filler concentration. The mixture is then introduced into the annular space between cylinder 34 and plug element 36. Thereafter tubular ram 38 is moved downwardly into the top portion of the annular space to exert an axial compaction force on the filled polymer mixture. An equal reaction force is provided by inner cylinder 35 to equally axially compress the bottom portion of the filled polymer mixture. Only moderate compacting pressures, in the range of about 250 to 2500 p.s.i., are used.

After the filled polymer mixture has been compacted in the FIG. 4 device, the ram 38 and inner cylinder 35 are disconnected from members 34 and 36 so that both ends of the tubular compacted preform 27 are exposed. An elongated tubular piston is then forced into either end of member 34 to eject annular preform 27 from the compacting device.

The compacting pressures used in the FIG. 4 device are selected to provide a tubular preform that can be safely handled without being easily distorted in shape or fractured into multiple pieces. No heat is used when applying the compaction pressures via ram 38. The polymer particles and optional filler particles are held together only by the mechanical compaction pressures that serve to increase the contact surface areas and form mechanical interlocks between particles.

The compaction device shown in FIG. 5 is similar to the FIG. 4 device except for its size. The tubular preform produced by the FIG. 5 device has a larger inner and outer diameter than preform 27 produced in the FIG. 4 device, such that the radial dimensions are different in the two devices. The FIG. 5 device includes an outer cylindrical wall 40, inner cylindrical wall 42, central plug 44, and annular compaction ram 46. Compaction pressures in the range of 250 to 2500 p.s.i. are employed.

In the case of the FIG. 5 device, the charge may consist solely of virgin fluoroethylene polymer particles of a type used for molding purposes. However, no heat is applied to the material while it is in the compaction device. The particles are held together solely by the compaction pressures.

After each tubular preform 26 and 27 has been separately formed, the two preforms will be arranged concentrically one within the other, in the compaction device shown in FIGS. 6 and 7. That device includes an outer cylindrical wall 48, inner cylindrical wall 50, and upstanding central plug 52. An annular compaction chamber 53 is formed of sufficient size to accommodate both tubular preforms 26 and 27. FIG. 6 shows the preforms partially inserted into the annular compaction chamber 53. FIG. 7 shows the preforms being compacted by an annular ram 54.

The cylindrical chamber walls 48 and plug 52 are sized to permit the preforms 26 and 27 to readily slide into the compaction chamber 53 without excessive frictional engagement between the preform surfaces and chamber wall surface, but without significant clearance between the confronting surfaces. Radial clearance between the preforms and wall 48 and plug 52 will be in the range from about 0.001 inch to about 0.020 inch. Similar radial clearance is provided between the opposed inner and outer surfaces on the tubular preforms 26, 27.

Ram 54 may be hydraulically or otherwise operated so as to exert an axial compaction force on preforms 26 and 27 in the range of about 2,000 to 20,000 p.s.i. Such pressures will achieve a further compaction and densification of the composite tubular preform that is greater than the compaction achieved by the individual compaction devices shown in FIGS. 4 and 5. This second compaction is a significant departure from conventional techniques because it has been generally believed that successive compactions of fluorine-based polymers such as PTFE would cause internal cracks and voids to form within the preforms. It was also generally believed that such cracks would not fuse or coalesce during a subsequent sintering operation. The present invention avoids such cracking through the use of low initial compaction pressures followed by higher compaction pressures.

The compacted composite tube is removed or ejected from the FIG. 7 compaction device and placed in an oven for sintering the fluoroethylene polymer in tube sections 26 and 27. The oven temperature is held in the range of 650° F. to 750° F. for a time period that may vary from about two hours to about 48 hours, depending on the size and radial thickness of the composite preform. During the sintering operation, the polymer particles will coalesce and fuse together.

The annular interface between tubes 26 and 27 will also coalesce during the sintering action. The polymer molecules which form the two tubes will be merged together, intertwined and fused so as to form one single tube. The tensile strength of the bond joint along interface 17 is typically 90% to 95% of the tensile strength of the weaker of the two sintered preforms and thus constitutes an extremely strong bond. The outer annular portion of the composite tube will, in this example, be formed from pure (unfilled) fluoroethylene polymer, while the inner annular portion of the composite tube will have fillers finely dispersed throughout the polymer. By sintering the preforms out of the mold, batch process free sintering is possible. This allows for more efficient use of the preform compaction molds.

Preferably, the same polymer is used for each component tube 26, 27 so that a relatively strong integral annular mechanical connecting joint is formed between the interlocked polymers in the inner and outer sections of the composite tube. Moreover, by using the same polymer for each component tube, differential thermal expansion is minimized. After the composite tube has been sintered, it is cut into radial slices, as depicted in FIG. 3. The final product is shown at 10 in FIGS. 1 and 2.

It should be noted that the only one sintering operation is performed on the polymers. The individual tubular preforms 26 and 27 are formed initially without the application of heat. Moreover, the two tubular preforms are assembled together and compacted into a unitary structure without the application of heat. It is only after the composite tube has been fully formed (as shown in FIG. 8) that heat is applied to sinter the polymer particles.

With such a sequence of manufacture, the molecular degradation of the end product will be relatively low. This is especially the case if virgin polymer resin is used as a charging material. A low degree of molecular degradation is advantageous in that the polymer material tends to have greater wear resistance and a higher elasticity and ability to fully recover its original shape after removal of distortional stresses. This is advantageous when the seal is used on an out-of-round shaft or off-center shaft because higher elasticity provides for better sealing around the seal-to-shaft interface.

As noted above, FIG. 1 shows one configuration that the end product can take. A second form is shown in FIG. 9. In this case the sealing element is a piston ring, wherein the inner annular portion 60 is the mounting section and the outer annular portion 62 is the sealing section. Annular portion 62 is a fluoroethylene polymer having dispersed fillers therein, whereas annular portion 60 is pure (unfilled) fluoroethylene polymer.

Various other disk-like sealing element configurations are possible using the invention. For example, both the inner 14 and outer 12 sections of element 10 may be unfilled, yet be formed of different types or grades of fluorinated or other resin material Moreover, the outer section 12 may be filled as well as the inner section 14, or the inner section 14 may be unfilled with the outer section 12 filled. Any polymer compatible with the compaction and sintering processes of PTFE may be used and any shape of preforms may be formed to create an article of manufacture formed of first and second bonded polymers which have different material properties.

I claim:

1. A method of forming annular sealing elements comprising the steps of:
   a. forming a first tubular preform by applying pressure in a range of 250 to 2500 PSI, without heat, to a confined mass of polymer powders comprising polytetrafluoroethylene;
   b. forming a second tubular preform by applying pressure in a range of 250 to 2500 PSI, without heat, to a confined mass of polymer powders comprising flourine-based polymer;
   c. arranging said first and second tubular preforms concentrically one within the other, to form a composite tube;
   d. applying pressure in the range of 2,000 to 20,000 PSI to said composite tube, to thus compact the tube and form a mechanical bond across the polymer powders at the annular interface between the two preforms;
   e. heating the compacted composite tube to sinter the polymers and achieve coalescence of the polymers at their annular interface, and
   f. slicing through said heated compacted composite tube along radial planes so as to form said sealing elements.

2. The method of claim 1 wherein prior to said heating said polymers are of virgin unsintered material.

3. The method of claim 1 wherein the pressure applied in step a is substantially the same as the pressure applied in step b.

4. The method of claim 1 wherein a heating temperature in the range of 650° F. to 750° F. is used in step e.

5. The method of claim 1 wherein the first and second tubular preforms are left untreated and uncoated during the period between their initial formation and their being concentrically arranged, per step c.

6. The method of claim 1, wherein said heating comprises free sintering said compacted tube n an oven.

* * * * *